United States Patent [19]
Raisanen

[11] Patent Number: 5,989,119
[45] Date of Patent: Nov. 23, 1999

[54] AUTOMATIC POWER FLOW FRESH AIR INLET

[75] Inventor: David Raisanen, Dassel, Minn.

[73] Assignee: Raydot Incorporated

[21] Appl. No.: 08/856,544

[22] Filed: May 15, 1997

Related U.S. Application Data

[63] Continuation-in-part of application No. 08/655,954, May 31, 1996, abandoned.

[51] Int. Cl.⁶ ..................................................... F24F 7/007
[52] U.S. Cl. .......................... 454/239; 454/253; 454/270; 454/333
[58] Field of Search .................................... 454/239, 253, 454/255, 256, 258, 270, 273, 304, 333

[56] References Cited

U.S. PATENT DOCUMENTS

| | | |
|---|---|---|
| 2,659,292 | 11/1953 | Kurek . |
| 2,771,020 | 12/1956 | Shanahan ................................. 454/317 |
| 3,174,423 | 3/1965 | Rigterink et al. . |
| 3,443,588 | 5/1969 | Banko . |
| 3,951,336 | 4/1976 | Miller et al. . |
| 4,043,256 | 8/1977 | Van Huis .............................. 454/255 X |
| 4,535,811 | 8/1985 | Wood et al. . |
| 4,628,954 | 12/1986 | Dayus . |
| 4,850,265 | 7/1989 | Raisanen ............................. 454/270 X |
| 5,088,388 | 2/1992 | Schaefer .............................. 454/270 X |
| 5,236,391 | 8/1993 | Schaefer .............................. 454/270 X |

FOREIGN PATENT DOCUMENTS

| 794334 | 1/1981 | U.S.S.R. ................................ 454/258 |
|---|---|---|

OTHER PUBLICATIONS

Raydot Brochure entitled "Fresh Ideas In Ventilation Technology" 1994.

Raydot Brochure entitled "Fresh Air Inlets, Providing Automatic, Maintenance Free, Air Replacement." 1993.

Raydot Three–Fold Folder entitled "Raydot Ventilation Systems" 1994.

*Primary Examiner*—Harold Joyce
*Attorney, Agent, or Firm*—Edwin E. Voight II

[57] ABSTRACT

A modular automatic power flow fresh air inlet comprising a housing having fresh air openings between a source of fresh air and a room, having an adjustable static pressure to be ventilated. The fresh air openings may be controlled by a valve plate pivotally connected to the housing at each opening. The valve plates pivot relative to the static pressure in the room. A cable having first and second ends extends through the housing and is connected to the valve plates via a lanyard. A cable control device for moving the cable between a forward position and a rearward position is connected to the first end of the cable. A cable counter weight is attached to the second end of the cable. Moving the cable toward the forward position places tension on the lanyard, causing the valve plate to pivot from the static position toward to the fully opened position. Moving the cable toward the rearward position relaxes the tension in the lanyard, causing the valve plate to pivot toward the static position. A plurality of fresh air inlets may thereby be connected in series via the cable for regulating an air flow course within a building.

34 Claims, 8 Drawing Sheets

AUTOMATIC POWER FLOW FRESH AIR INLET

This application is a continuation-in-part of the application entitled "Automatic Power Flow Fresh Air Inlet", Ser. No. 08/655,954, filed on May 31, 1996 abandoned.

BACKGROUND OF THE INVENTION

The present invention relates to a modular automatic power flow fresh air inlet for controlling the velocity, volume, and direction of air entering from a fresh air source to ventilate a room.

Room ventilation is extremely important in the poultry and livestock industries. The livestock and poultry industries need controlled indoor conditions to raise animals effectively. Insufficiently ventilated indoor confinement areas may cause problems with disease due to the spreading and multiplying of viruses and bacteria. Disease may also spread from one animal to another due to stale, stagnant air. Ventilation may improve health and environmental conditions in an animal confinement room. Fresh air inlets maintain proper ventilation by providing fresh air for the animals to breathe and by controlling temperatures, static pressure, and moisture buildup.

An important area of concern in the ventilation of livestock and poultry buildings is the control of velocity, volume, and direction of air entering the building from a fresh air source to change ambient environmental conditions. Temperature, for example, may be controlled by regulating the velocity and volume of air in the building. Seasonal, and even daily, changes in the ambient environmental conditions require adjusting of each air inlet to maintain a consistent room environment. During hot months, a high velocity air stream may be desirable to provide additional cooling to animals contained in the confinement room. In colder months, a draft may make animals more susceptible to disease, making it desirable to reduce the flow of air in the room or redirect the flow of air away from the animals.

A confinement room may also be divided into zones. The ability to control the environmental conditions in a particular zone within a room is extremely important and critical to the success of a livestock or poultry farm or feed-lot operation since different zones may require different air flow characteristics. Various fresh air inlets have been used to allow fresh air to enter into a room from the exterior of a building. These air inlets typically extend from outside the building into the room. Zone control has proven to be difficult and inaccurate with these types of air inlets due to the difficulty of adjustment and coordinated individual control of the air inlets to achieve a desired zone air circulation course. Furthermore, air inlets are not easily grouped into a zone control assembly for air flow control within a large zone. Zone control is accomplished, if at all, by manually adjusting each air inlet to an appropriate desired setting.

Prior automatic power flow fresh air inlets rely extensively on the adjustment of the static air pressure in a room to provide the necessary control over the air inlets. A negative static pressure is created using fans positioned to force the interior stale air within a room to the exterior of a building. The presence of a negative static pressure in a room forces valve plates, positioned within the air inlets, to pivot open, allowing fresh air to enter a room. Decreasing the static pressure within a room thereby increases the air flow. Conversely, increasing the static pressure within a room decreases the air flow within a zone within the interior of a building. When the static air pressure in the room is zero or greater, as determined by an individual, air flow within a room will be minimal.

The reliance on static air pressure control ventilation for a building has several drawbacks. First, adjusting the valve openings of the prior designs is highly inconvenient and time consuming, necessitating that each air inlet be adjusted manually requiring direct access to the air inlet through the use of ladders or other means. Second, in the event of a power failure, the valve plates of the air inlets frequently close, preventing fresh air to flow through the inlets. In this situation, fans which are used to create a negative static pressure within the building fail to function, causing the valves to close, terminating air flow within an environmental zone. Finally, due to the inconvenience of adjusting the valve plates, regular daily adjustments within environmental control may not be implemented to maintain optimal environmental conditions in a room such as temperature as other outdoor environmental conditions change throughout a day.

For the foregoing reasons, there is a need for an automatic power flow fresh air inlet having a convenient means to adjust the air inlets without complete reliance on static pressure conditions in the room.

SUMMARY OF THE INVENTION

A modular power flow fresh air inlet comprising a housing having an air hole between a source of fresh air and a room to be ventilated. The air hole comprising a fresh air entrance opening to the source of fresh air. The fresh air entrance is divided into fresh air openings which are each controlled by a valve plate pivotally connected to the housing by each opening. The valve plates pivot to bear against a valve seat to close a fresh air opening or alternatively pivot away from the valve seat to allow air to enter the room and each valve plate has an air deflecting surface thereon to direct the air. The valve plate pivots progressively to a position from fully closed to fully open. A drive rod is connected to the valve and extends axially through the housing. A linear actuator is mounted in a fixed relation to the housing and is connected to the air inlet at the drive rod to control the position of the valve whereby air enters the room through the inlet at a controlled volume, direction, or velocity.

The automatic power flow fresh air inlet comprising a housing having fresh air opening between a source of fresh air and a room to be ventilated. The fresh air openings are each controlled by a valve pivotally connected to the housing at each opening. The valve plates pivot relative to the static pressure in the room. At certain levels of static pressure, the valve plates pivot away from a valve seat toward a fully opened position to form an air passageway through which fresh air may enter a room. At other levels of static pressure, the valve plates pivot to bear against the valve seat to a closed position to close the air passageway due to a valve counter weight which applies an adjustable closing movement of the valve plate. Each valve plate has an air deflecting surface for directing air, application of the static pressure and the valve counterweight to the valve plate causes the valve plate to move to a static position. The automatic power flow fresh air inlet further comprising a cable having first and second ends extending through a plurality of housings which are connected to individual valve plates via a plurality of individual lanyards. A cable control device for moving the cable between a forward position and a rearward position is connected to the first end of the cable. A cable counterweight is attached to the second end of the cable. Moving the cable toward the forward position places tension on the cable, causing the valve plates to pivot from the static position toward the fully opened position. Releasing the cable, thereby permitting rearward positioning relaxes the tension in the lanyard, causing the individual valve plates to pivot toward the static or closed position. Locking mechanisms may be attached to the cable for retention in a desired position.

It is an object of the present invention to provide an air inlet which mounts directly to a ceiling for providing air flow between an attic space and a room to be ventilated.

Another object of the present invention is to provide a modular fresh air inlet for use with other modular fresh air inlets to control air flow in a zone of a room.

Still another object of the present invention is to provide an air inlet which may be rigidly connected to other air inlets.

Still another object of the present invention is to provide a control mechanism connected to a plurality of air inlets to provide accurate, balanced, air flow control across all connected air inlets.

Still another object of the present invention is to provide a rigid link between the control mechanism and the air inlet for pushing or pulling the rigid link to change the air flow characteristics of the inlet.

Still another object of the present invention is to provide a control system for a plurality of air flow inlets which alternatively and/or simultaneously may operate under static air conditions or manual override settings as desired by an individual.

Still another object of the present invention is to provide a new and improved control system for a plurality of air flow inlets of relatively inexpensive design, construction, and operation, which fulfill the intended purpose without fear of damage to property and/or injury to animals within a confinement area within a building.

Still another object of the present invention is to provide a control system for a plurality of air flow inlets which may be utilized to regulate air flow within a building during periods of power outage.

Still another object of the present invention is to provide a control system for a plurality of air flow inlets which may be utilized to regulate air flow within a building regardless of static air pressure conditions within the building.

Still another object of the present invention is to provide an air inlet which mounts directly to a ceiling for providing air flow between a source of fresh air and a room to be ventilated relative to the static air pressure within a room.

Still another object of the present invention is to provide a new and improved control system for a plurality of air flow inlets for regulation of air flow through the adjustment of static pressure within a room.

Still another object of the present invention is to provide a convenient means for increasing the air passageway relative to the static position of the valve plates within a plurality of air flow inlets.

Still another object of the present invention is to provide a convenient means to decrease air passageways relative to the static position of valve plates of a plurality of air flow inlets.

Still another object of the present invention is the provision of modular fresh air inlets for use in series with other modular fresh air inlets for the control of air flow within the zone of a room.

Still another object of the present invention is to provide a convenient means to manually adjust a plurality of air passageways for a series of modular fresh air inlets for a building.

Still another object of the present invention is to provide improved control over air flow in the zone of a room by enabling convenient adjustment of a series of modular fresh air inlets.

A feature of the present invention is a rigid link between the control mechanism and the air inlets.

Another feature of the present invention is a drive rod in the inlet which may be used to rigidly link the individual air inlets.

Still another feature of the present invention is an adjustable connection between the drive rod and the valve plate.

Still another feature of the present invention is a zone control assembly comprising several air inlets rigidly linked together and to a control mechanism.

Still another feature of the present invention is an environment computer for coordinating air flow control across a zone, room, or building.

Still another feature of the present invention is an environmental control attached to a control mechanism or the environment computer.

Still another feature of the present invention is the provision of an electronic control device for adjusting the air passageways within a plurality of air flow inlets within a building.

Still another feature of the present invention is the provision of an environmental computer for coordinating air flow control across a zone, room, or building.

Still another feature of the present invention is a cable having a first end and second end engaged in series through a plurality of housings of air flow inlets.

Still another feature of the present invention is a cable engaged to pulleys, to a counterweight, and to a means for manipulation for adjustment of a series of valves within a plurality of air flow inlets for regulation of air flow within a building, regardless of static air pressure conditions within the building.

Still another feature of the present invention is a plurality of stops adjustably connected to the cable for engagement to the valves of a plurality of air flow inlets for regulation of the size of the valve openings which, in turn, regulates the air flow conditions within a building.

Still another feature of the present invention is a means for manipulating connected to one end of the cable which may be engaged through automatic or manual manipulation for opening of a series of air flow inlets for regulation of air flow within a building.

Still another feature of the present invention is a counterweight connected to the second end of a cable which releases a plurality of air flow inlets for operation under normal static conditions upon the release of the means for manipulation.

Still another feature of the present invention is a plurality of lanyards adjustably interconnected between the valves of the fresh air inlets and the stops which are adjustably connected to the cable for regulation of the size of the air flow openings upon the engagement of the means for manipulation during the regulation of air flow within a building.

DESCRIPTION OF THE PREFERRED EMBODIMENT

Figure 3:
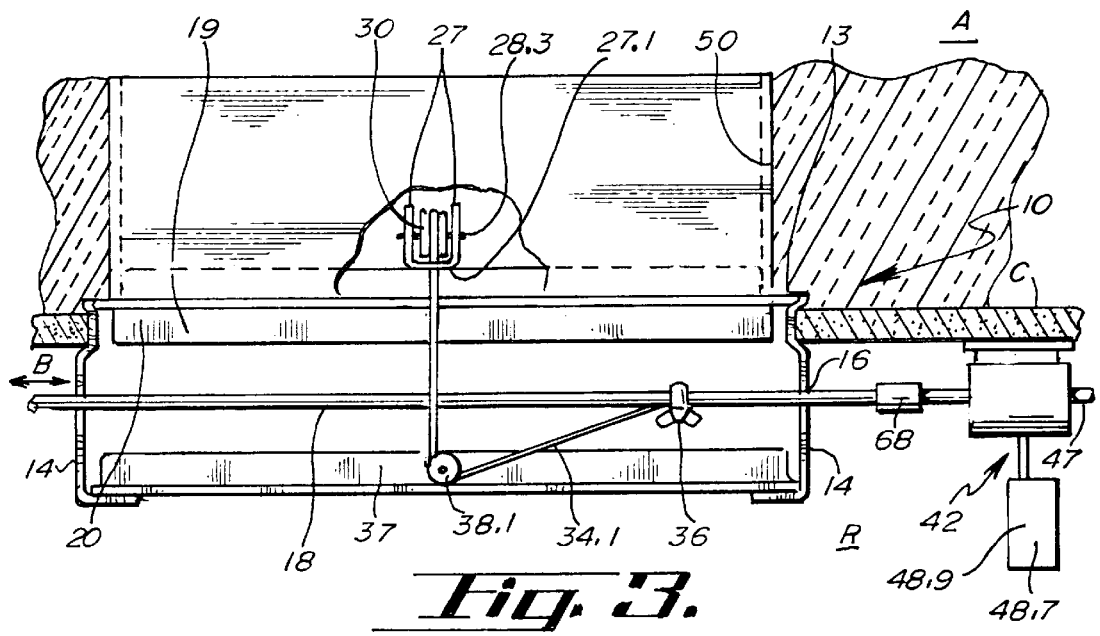
FIG. 3 is a side elevation view of an air inlet.
Figure 1:
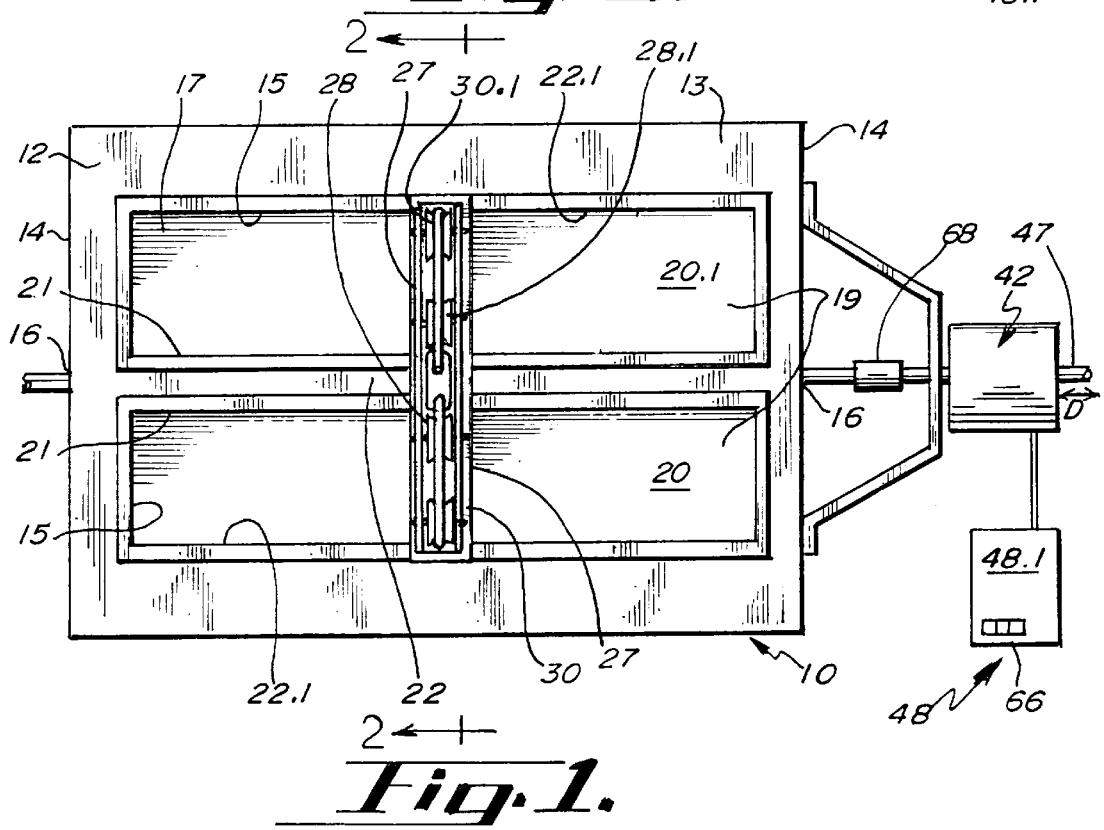
FIG. 1 is an elevation view of a single power flow fresh air inlet.
Figure 5:
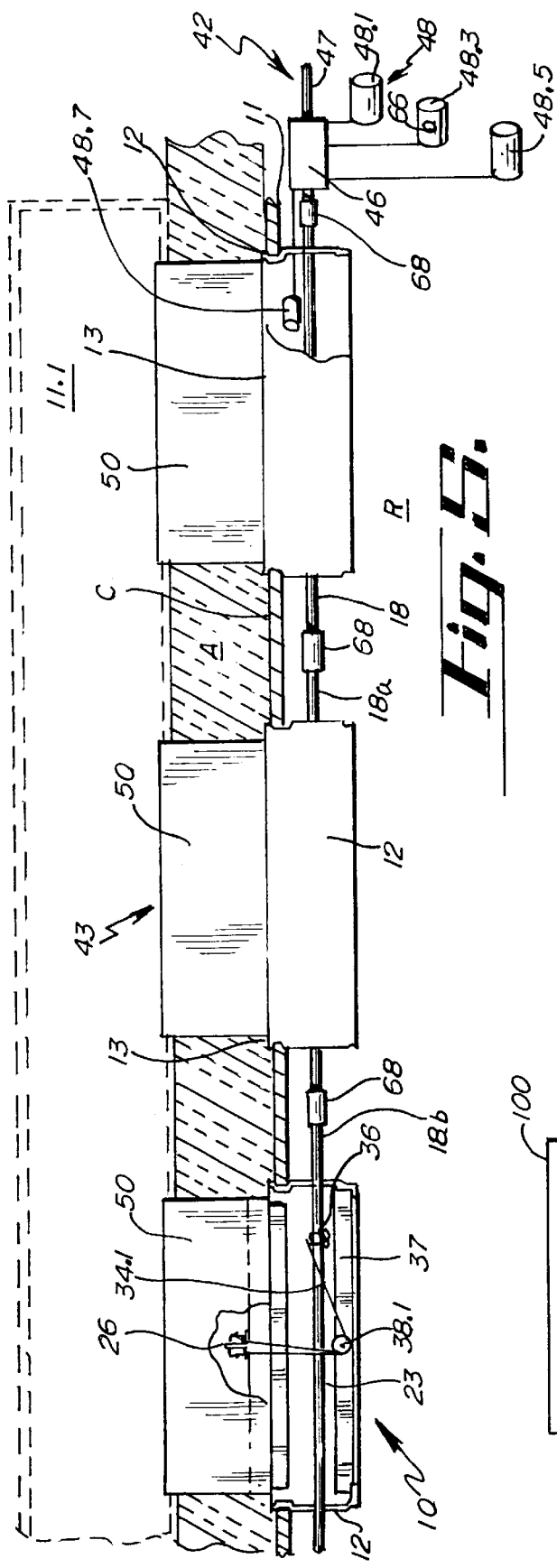
FIG. 5 is a section view of a modular fresh air assembly mounted in a ceiling connected to a central fresh air duct.

Referring to FIG. 1, the power flow fresh air inlet indicated in general by the numeral 10 comprising a main housing 12 having a top wall 13, end walls 14 and air hole 17 having fresh air entrance 15. As shown in FIGS. 3 and 5, a barrier such as a ceiling C separates a fresh air chamber such as an attic A or central duct 11.1 (shown in FIG. 5) from the room R to be ventilated. The invention will be described using the preferred embodiment using an attic as the fresh air chamber. Air hole 17 extends through top wall 13 between attic A and room R.

Figure 6:
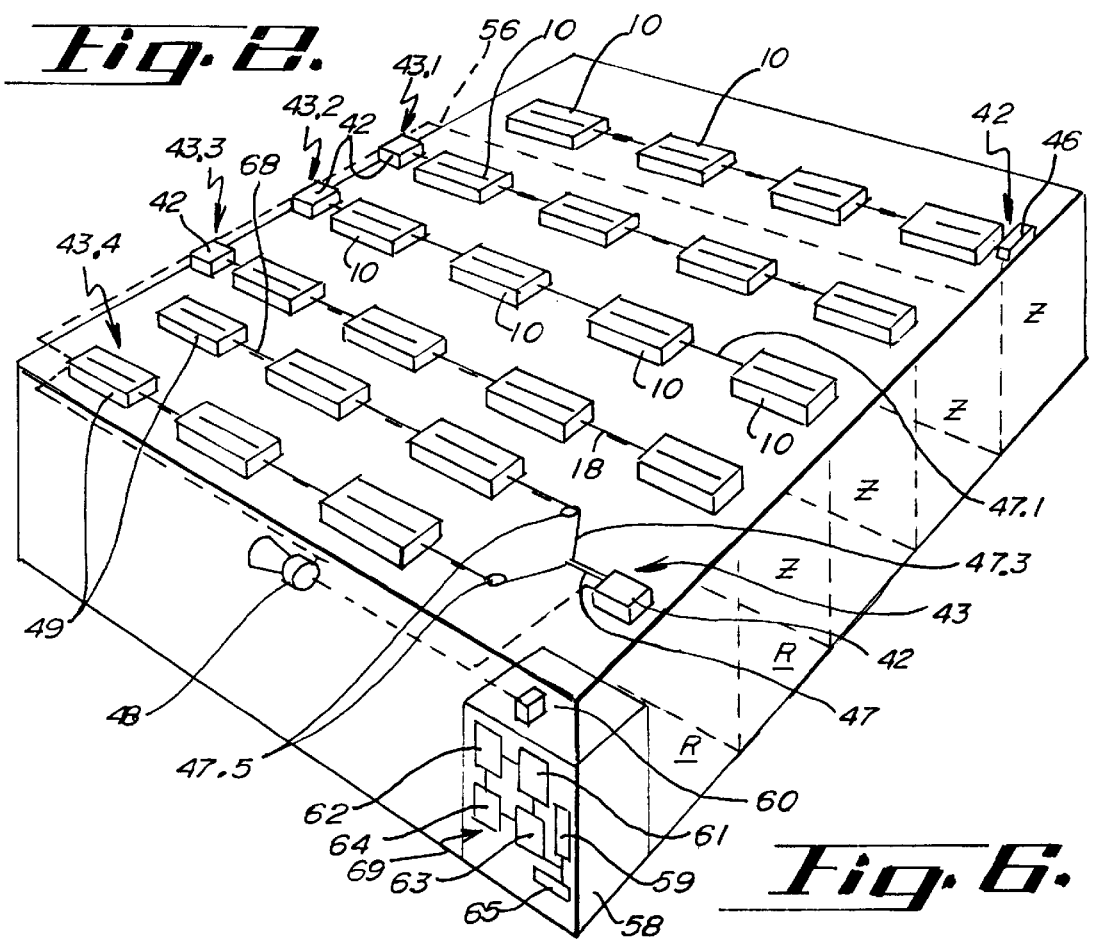
FIG. 6 is a section view of a room with modular fresh air assemblies connected to an environment computer for zone control.

Referring to FIGS. 1 and 3, a drive rod aperture 16 is formed in each end wall 14. A drive rod 18 is slidably mounted in the fresh air inlet 10 extending through the drive rod apertures 16. The drive rod 18 extends generally perpendicular to the end walls 14 to connect to a control mechanism 42 or an adjacent fresh air inlet 10 as shown in FIG. 6.

Continuing to refer to FIG. 1, a valve 19 is pivotally mounted on the housing 12 to progressively open and close a fresh air entrance 15. In the embodiment shown in FIG. 1, the valve 19 comprises a plurality of valve plates, shown as first valve plate 20 and second valve plate 20.1. It should be understood, first valve plate 20 and second valve plate 20.1 are similar and move in relation to each other and are connected to the drive rod 18 as will be described below. For purposes of illustration, the fresh air inlet 10 will be discussed with reference to first valve plate 20 and refer to the second valve plate 20.1 where necessary.

Figure 4:
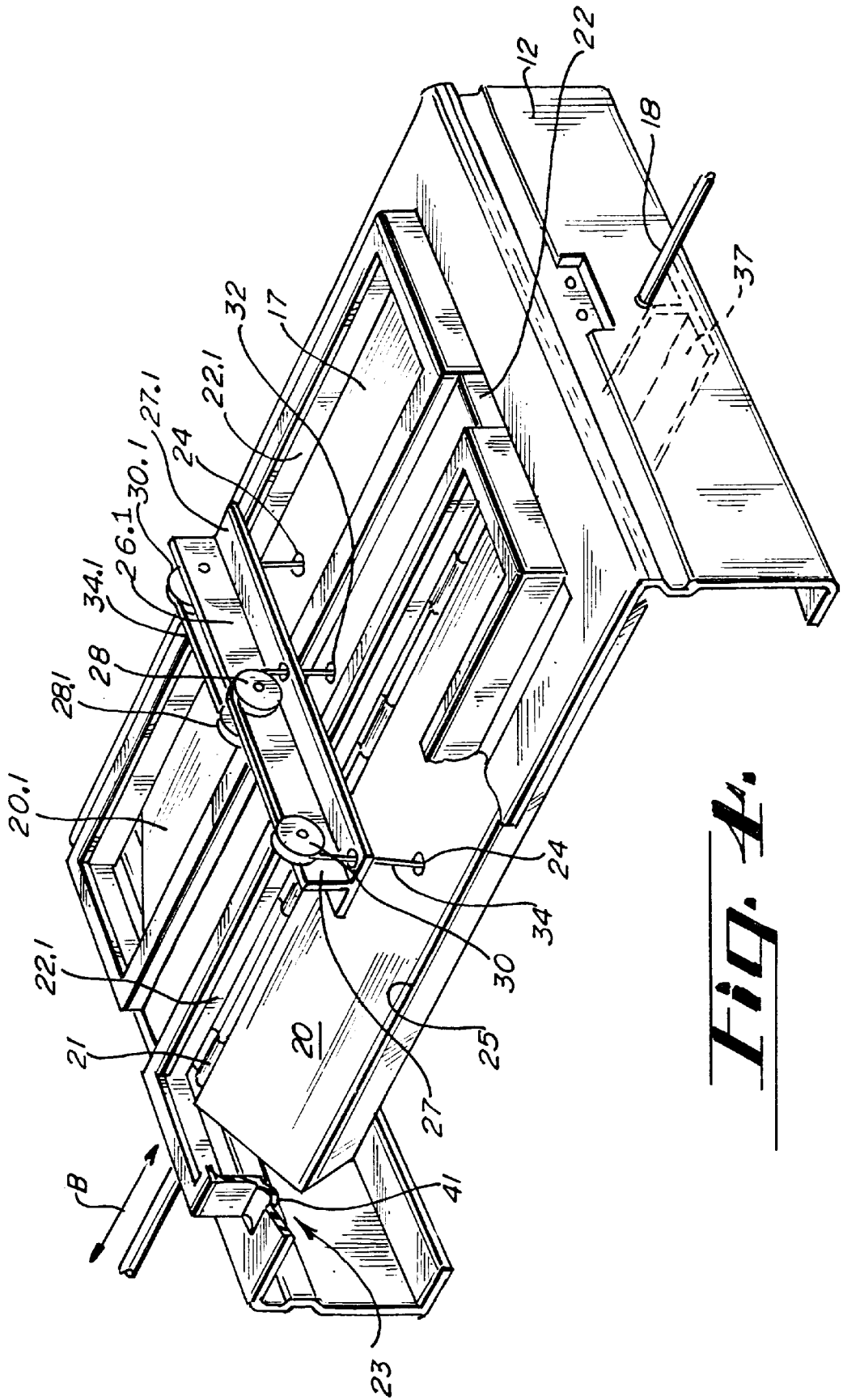
FIG. 4 is a perspective view of an individual air inlet illustrating an alternative embodiment of the upper support bar.

Referring to FIG. 4, the first valve plate 20 is pivotally mounted on the divider 22 which separates the fresh air entrance 15 (FIG. 1) into individual fresh air openings 22.1. The first valve plate 20 pivots on hinge 21 connected to the first valve plate 20 and to the divider 22. The hinge 21 may be a piano hinge type sealingly attaching the first valve plate 20 to the divider 22 to prevent air leakage along the hinge 21. The first valve plate 20 and the housing 12 are mounted in an orientation wherein gravity urges the first valve plate 20 to swing into the open position 44 shown in FIG. 2.

Figure 2:
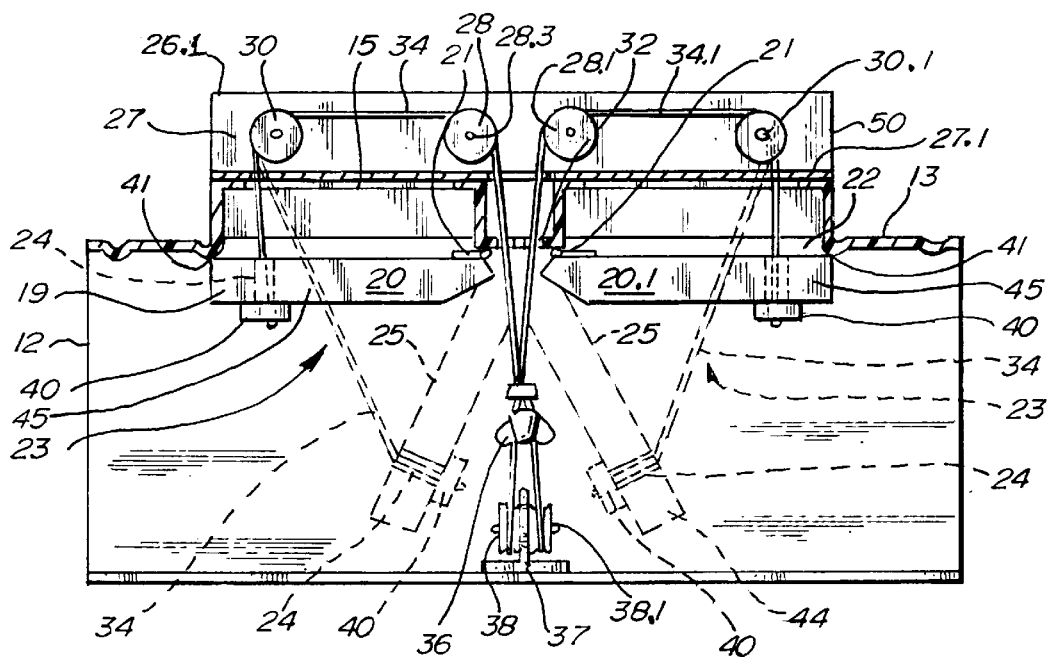
FIG. 2 is a section view of an air inlet taken at approximately 2—2 of FIG. 1.

Referring to FIG. 2, a rope hole 24 extends through the first valve plate 20. An air deflecting face 25 is on first valve plate 20 for deflecting the direction of air passing through the fresh air inlet 10 at fresh air opening 22.1.

Continuing to refer to FIGS. 2 and 4, an upper support bar 26 is attached to the housing 12 above the first valve plate 20. In the embodiment shown in FIG. 2, the upper support bar 26 traverses the air openings 22.1. Referring to FIG. 3, the upper support bar 26 has a U-shape having a pair of vertical plate portions 27 and a horizontal plate portion 27.1 connected between the vertical plate portions 27. The upper support bar 26 is connected to the housing 12 at the horizontal plate portion 27.1. The upper support bar 26 illustrated in FIG. 4 has an inverted T-shape having a horizontal plate portion 27.1 on the housing 12 connected to one vertical plate portion 27 pivotally connected to and supporting the pulleys 30, 30.1, 28, and 28.1. (FIG. 4)

Continuing to refer to FIG. 2, a first center pulley 28 and a second center pulley 28.1 are pivotally mounted on the upper support bar 26 between the pair of vertical plate portions 27 and above the divider 22. The first center pulley 28 is mounted on pin 28.3 which extends generally perpendicularly through both vertical plate portions 27, other pulleys are similarly pivotally mounted. A first lift pulley 30 is pivotally mounted on the upper support bar 26 between the vertical plate portions 27 and positioned over the first valve plate 20. A second lift pulley 30.1 is pivotally mounted on the upper support bar 26 between the vertical plate portions 27 and positioned over the second valve plate 20.1.

Referring to FIG. 2, the first valve plate 20 has an air deflecting face 25 for directing air passing through the fresh air inlet 10. The air deflecting face 25 is progressively changed from the fully open position 44 to the closed position 45. In the closed position 45, the air deflecting face 25 bears against the valve seat 41 to sealingly close off the fresh air entrance 15. An important feature of the fresh air inlet 10 is the ability to adjust the position of the air deflecting face 25 about the hinge 21 to direct the air flow coming through the housing 12. As should be understood, during warm months, direct downward drafts of air onto animals in the room R may be desirable for keeping the animals cool. During cooler months, direct downward drafts may create health problems with the animals and the air deflecting face 25 on the first valve plate 20 may be adjusted by the drive rod 18, as described below, to direct air coming from the fresh air source A in a path more closely parallel to the ceiling C. (Shown in FIG. 3)

As illustrated in FIGS. 2, and 3, a lower support bar 37 extends generally parallel to the drive rod 18 and the divider 22 and is mounted below the first and second valve plates 20, 20.1 respectively. As shown in FIG. 2, first alignment pulley 38 and second alignment pulley 38.1 are pivotally mounted on the lower support bar 37 below the center hole 32. The drive rod 18 is connected to the first valve plate 20 by a first rope 34 and to the second valve plate 20.1 by a second rope 34.1. The first rope 34 and second rope 34.1 are preferably of stainless steel cable but may also be rope made of natural or synthetic materials. A locking nut rod connector 36, illustrated in FIG. 3, connects the first rope 34 and the second rope 34.1 to the drive rod 18. As shown in FIG. 2, the first rope 34 is supported by the upper support bar 26.1 at the first center pulley 28 and first lift pulley 30 to bear against the first valve plate 20.

Referring to FIG. 2, a rope stop 40 attaches to the first rope 34 as it extends through the rope hole 24. The rope stop 40 will not pass through the rope hole 24 and bears against the first valve plate 20 to resist gravity and urge the first valve plate 20 into the closed position 45. The second rope 34.1 is connected to the second valve plate 20.1 and supported by the upper support bar 26 in a similar fashion. The first rope 34 also extends around the first alignment pulley 38 between the locking nut rod connector 36 and the first center pulley 28 to align the first rope 34 with the center hole 32. The second rope 34.1 is similarly aligned with the center hole 32 by passing around the second alignment pulley 38.1 between the locking nut rod connector 36 and the second center pulley 28.1.

Continuing to refer to FIG. 2, first valve plate 20 is shown in phantom in the open position 44. In the closed position 45, the valve plate 20 or 20.1 bears against the valve seat 41 on the top wall 13. The air passageway 23 will progressively change in size as the first valve plate 20 is progressively moved between the open position 44 and the closed position 45.

Referring to FIGS. 1 and 3, the control mechanism 42 is connected to the drive rod 18 to move the drive rod 18 axially through the housing 12 to control the pivot position of the first valve plate 20 as illustrated in FIG. 2. The control mechanism 42 may comprise a linear actuator 46 having an arm 47 connected to the drive rod 18. (FIG. 5) The control mechanism 42 is mounted in a fixed relation to the housing 12 of one air inlet 10. The linear actuator 46 may be mounted on the ceiling C as shown in FIG. 3 or directly on the housing 12 as shown in FIG. 1. The linear actuator 46 moves the arm 47 axially (FIG. 1, arrow D) in a direction generally parallel to the ceiling C to affect the size of the air passageway 23. The arm 47 bears against the drive rod 18 to urge the drive rod 18 to move axially through the drive rod apertures 16 (FIG. 3, arrow B).

Referring to FIGS. 5 and 6, a modular fresh air assembly 43 for a zone control is illustrated comprising a plurality of rigidly interconnected fresh air inlets 10. The drive rods illustrated in FIG. 5 by the numerals 18, 18a, 18b are connected in an end-to-end fashion by welding or with rod splice 68. The drive rod 18 closest to the control mechanism 42 is similarly connected to the arm 47 thus extending arm 47 through each fresh air inlet 10. In this configuration, arm 47 forms a rigid link between the linear actuator 46 and each air inlet 10. Alternatively, long arm 47.1 (shown in FIG. 6) may be long enough to extend from control mechanism 42 through all air inlets 10 in zone control assembly 43.2. In this configuration, the first and second valve plates 20, 20.1 respectively are attached to the long arm 47.1 with connector 36 and ropes 34, 34.1 as described above.

Referring to FIG. 6, control mechanism 42 may alternatively be connected to the rigidly interconnected air inlets 10 by use of cable 47.3 connected to arm 47 on one end and to drive rod 18 at the other end. Linear movement of the cable 47.3 by control mechanism 42 causes cable 47.3 to bear against drive rod 18 to control the position of the first and second valve plates 20, 20.1 respectively, as discussed above. Cable pulley 47.5 is used to align the motion of the control mechanism 42 with the desired axial motion of drive rod 18. In this configuration, a modular fresh air assembly 43 may comprise a single control mechanism 42 attached to several air inlet groups 49 comprising a plurality of air inlets 10 rigidly attached to each other at drive rod 18.

Referring to FIG. 5, an environmental control 48 such as temperature control 48.1, static pressure control. 48.3, humidity control 48.5, or air speed 48.7 (FIG. 3) is connected to the control mechanism 42. The environmental control 48 senses an environmental condition (temperature, static pressure, humidity or air speed) in a zone Z or an entire room R and controls air flow by sending a signal to linear actuator 46. Linear actuator 46 moves arm 47 in response to the signal from environmental control 48. Insulation shroud 50 is installed on housing 10 (FIG. 3) at top wall 13 to prevent insulation or other debris in attic A from entering room R through air passageway 23.

Referring to FIG. 6, a network 56 connects several modular fresh air assemblies, illustrated by the numerals 43, 43.1, 43.3, 43.4, to an environment computer 58 for zone control. Environmental control 48 may alternatively be connected directly to the network 56. The environment computer 58 has a control signal sender 59 to send control signals through network 56 to each zone control assembly. Signal receiver 60 in environment computer 58 receives environmental signals from environmental control 48 or control mechanism 42.

The environment computer 58 has circuitry 69 configured to process signals received from the environmental controls 48 in the room R and generate control signals to the respective control mechanism 42 for a modular fresh air assembly 43. The circuitry 69 in the environment computer 58 has a memory 61, an information input 62 such as keyboard for entering desired environmental information, a comparator 63 for comparing desired environmental conditions to signals received from the environmental controls 48, a means for averaging signals 64 and a daily recorder 65 such as a disk or tape drive. The circuitry 69 in the environment computer 58 is configured to perform a signal analysis phase illustrated in the sequence of operation in the block diagram of FIG. 7.

Figure 7:
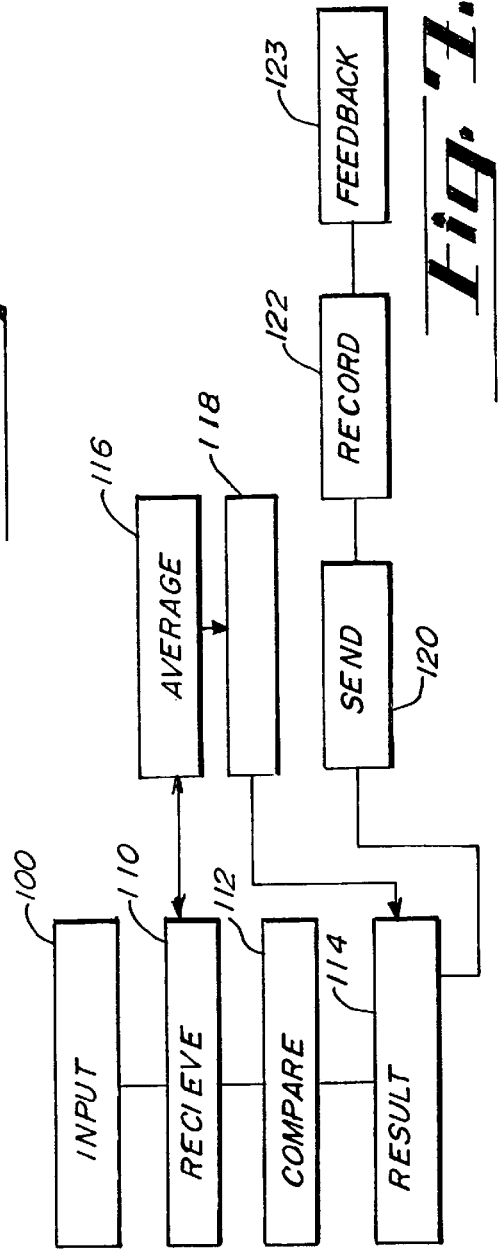
FIG. 7 is a block diagram of the signal analysis phase.

With reference to FIG. 7, the sequence commences with block 100 which receives a set of desired environmental conditions for each zone Z from information input 62. Block 100 places this information in memory 61. Block 110 then receives an environmental signal from environmental control 48 through signal receiver 60. Block 110 places this environmental signal in memory 61.

If a single environmental signal is being used to control the zone Z, block 112 sends the environmental signal from block 100 and the environmental signal from block 110 to the comparator 63. Block 112 receives the result from comparator 63 and places the result in memory 61. Block 114 receives the result from the comparator 63 and generates a desired valve 19 position to central air flow into the room R.

Continuing to refer to FIG. 7, if the environment computer 58 is averaging several environmental signals, block 110 receives several environmental signals from signal receiver 60 and places the environmental signals in memory 61. The environmental signals from block 110 are then sent to block 116 which performs an averaging function using averaging means 64 to create an average based on a predetermined formula. The average of environmental signals from block 110 is sent to block 118 by block 116 which retrieves the desired condition signal placed in memory by block 100 and presents the average and the desired conditions to the comparator 63. Block 118 receives the result from comparator 63 and places it in memory 61. Block 114 receives the result of comparator 63 from block 118 and generates a desired valve 19 position.

Referring to FIG. 7, the desired valve 19 position from block 114 is calculated based on a second predetermined algorithm and sent to block 120 and placed in memory 61. Block 120 transfers the desired valve position to control signal sender 59. Control signal sender 59 communicates the desired valve 19 position as a control signal to one or more control mechanisms 42. Block 122 communicates with memory 61 to record all signals in memory 61 from signal input 62, signal receiver 60, means averaging 64, comparator 63 and data recorder 65. These signals are used by block 123 to proportionally adjust the means for averaging 64, the comparator 63 and predetermined formula and algorithms.

In operation, fresh air inlets 10 are mounted in ceiling C in a desired pattern. Drive rods 18, 18*a* are rigidly and longitudinally joined end-to-end at rod splice 68 by welding or similar methods to form modular fresh air assembly 43. Room R may be divided into zones Z as shown in FIG. 6. Control mechanism 42 is connected to an air inlet 10 or a modular fresh air assembly 43 for zone control. The control mechanism 42 is mounted in a fixed relation to one fresh air inlet 10 in the modular fresh air assembly 43.

Referring to FIGS. 2, 3 and 4, the first rope 34 extends from the rod connector 36 around first alignment pulley 38, through center hole 32, around first center pulley 28 and first lift pulley 30 and through rope hole 24 where it is secured by first rope stop 40. It should be understood, second valve plate 20.1 is connected to drive rod 18 by second rope 34.1 in a similar manner. Rod connector 36 may be adjustably positioned along drive rod 18. Air inlets 10 may be provided with ropes in place prior to being mounted in ceiling C.

One or more environmental controls 48 are placed in the room R to be ventilated and connected to communicate to a control mechanism 42 or the environmental computer 58. The desired environmental condition, such as temperature or pressure, is set on environmental control 48 with adjustment 66 (shown in FIG. 1) or in environmental computer 58 by information input 62. An exhaust fan (not shown) is operated to exhaust stale air from the room R. Environmental control 48 senses the environmental condition adjacent control 48 and generates an environmental signal.

Referring to FIG. 6, environmental control 48 sends a control signal to the control mechanism such as the linear actuator 46. Linear actuator 46 adjusts the air flow through the air inlet 10 by adjusting the position of the valve 19 connected to drive rod 18. Environmental control 48 continues to send control signals to control air flow through air inlet 10 to replace exhausted, stale air. Linear actuator 46 continues to progressively adjust the position of valve plates 20, 20.1 between the open position 44 and closed position 45 to adjust the environment adjacent the environmental control 48.

Environment computer 58 receives a signal from one or more environmental controls 48. Signals are received by signal receiver 60 and stored in memory 61. The desired flow is calculated by environment computer 58 using the circuitry 65 configured for signal phase analysis. Control signal sender 59 transmits a control signal along network 56 to a selected control mechanism 42. Control mechanism 42 adjusts the position of arm 47 to control air flow from the attic A into room R in zone Z. Signal receiver 60 continues to receive environmental signals from environmental control 48. The environmental signals are used to continue to adjust the control signal from signal sender 59 to control mechanism 42 to control volume, velocity and direction of air coming through zone control assembly 43.

Environment computer 58 may also use environmental signals from one or more environmental controls 48 and uses averaging means 64 to average the environmental signals prior to sending an averaged environmental signal to signal comparator 63. Under this condition, the average of several signals are compared to the desired environmental condition resulting in a calculated environmental signal from signal sender 59 to control mechanism 42.

Environment computer 58 uses data recorder 65 to record environmental signals received and desired environmental conditions input into the computer 58. These signals are stored for a long time and may be used to calculate and adjust the result of signal comparator 63 or the formula in block 116.

Referring to FIG. 5, air inlets 10 and zone control assemblies 43 may alternatively be used with a central air duct 11.1 supplying fresh air to fresh air entrance 15. It should be understood, central air duct 11.1 may provide fresh air which has the temperature or humidity seasonally adjusted prior to entering room R.

Seasonal adjustments are made at environmental control 48 or environment computer 58. It should be understood, the fresh air inlet 10 may be used as a stand alone device, as shown in FIGS. 1–4, with a dedicated control mechanism in groups 49 of air inlets or modular fresh air assemblies 43, as shown in FIGS. 5 and 6 and described above, for zone control.

Figure 8:
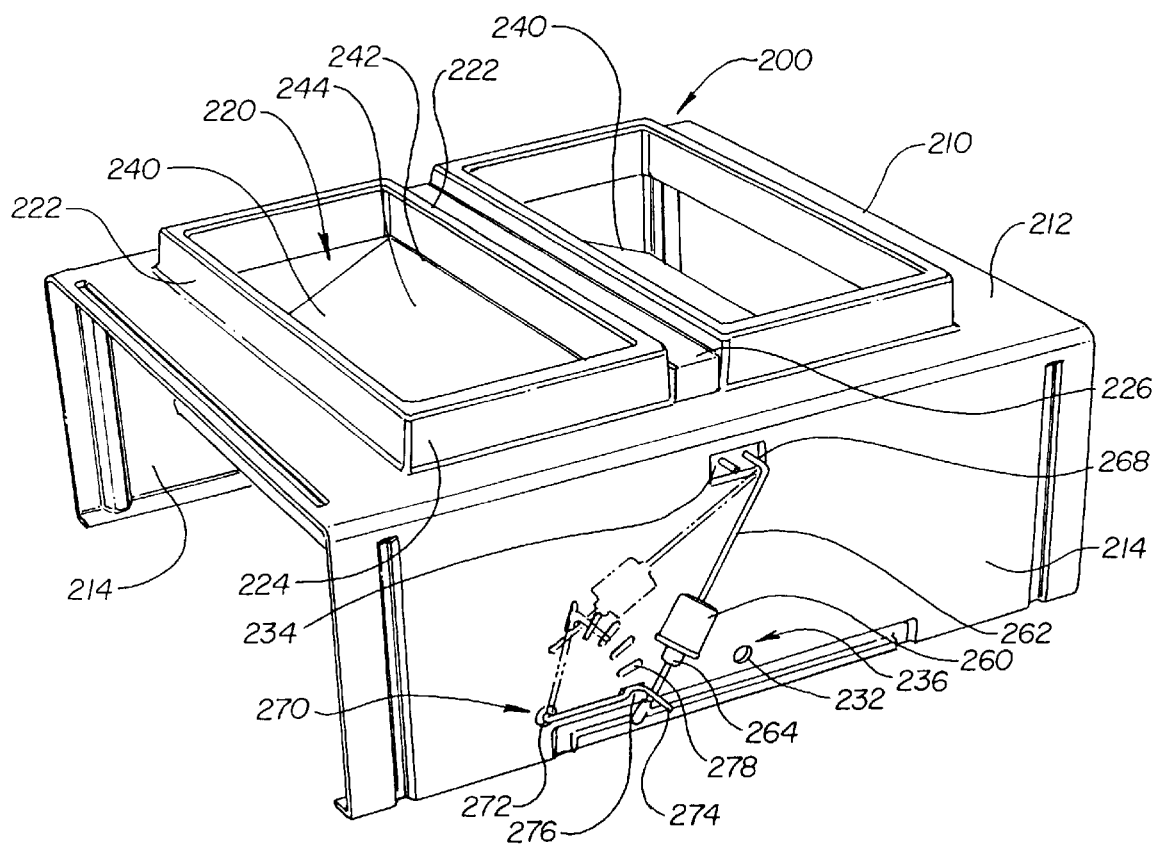
FIG. 8 is a perspective view of an alternative automatic fresh air inlet.
Figure 9:
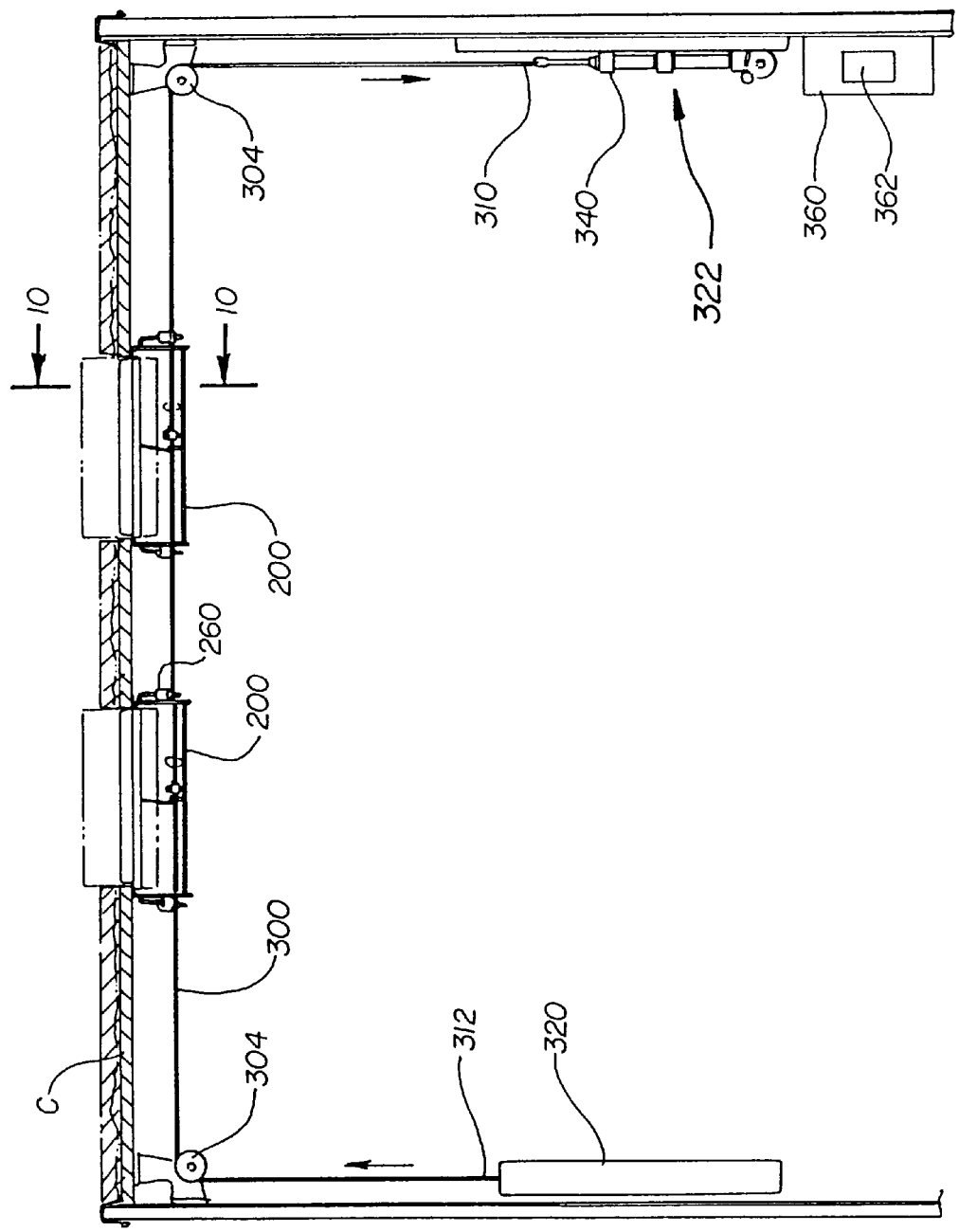
FIG. 9 is a side environmental view of a modular fresh air inlet assembly mounted in a ceiling of a building shown in cross-section.
Figure 10:
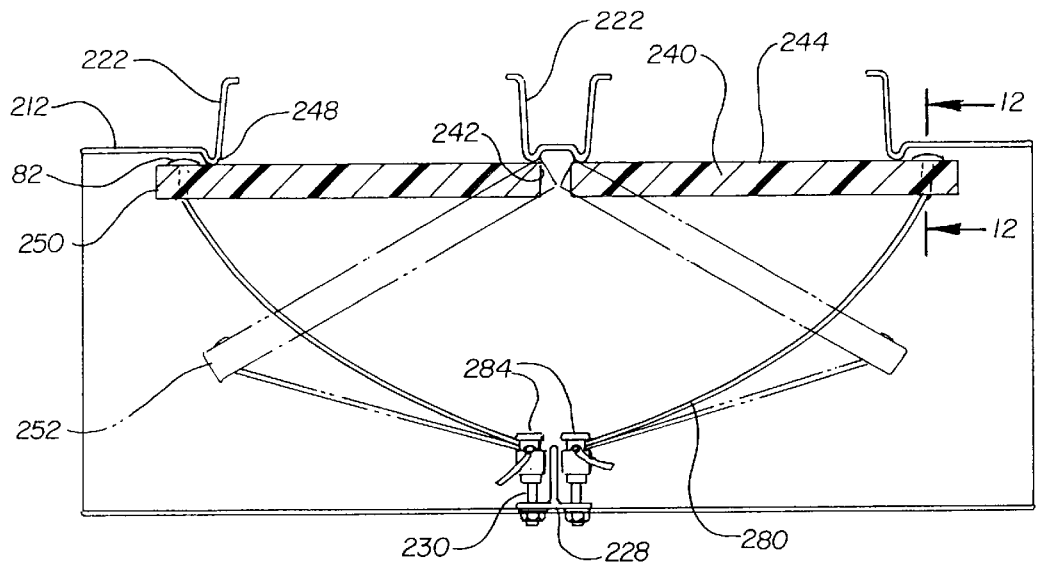
FIG. 10 is a cross-sectional side view of an air inlet taken at approximately the line of 10—10 of FIG. 9.
Figure 11:
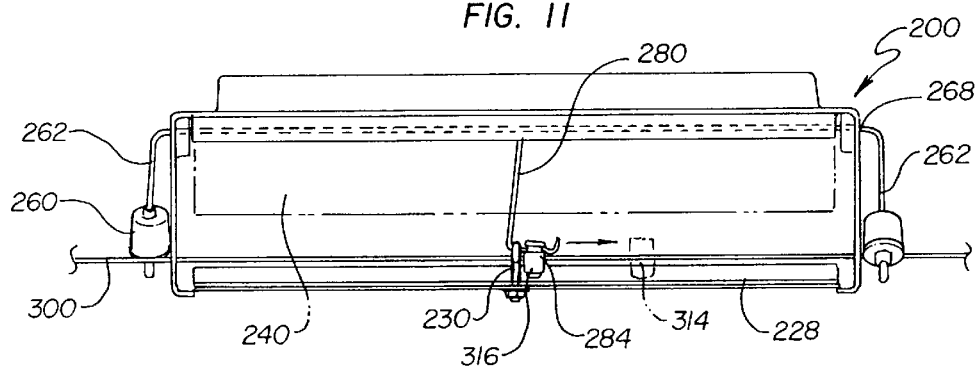
FIG. 11 is a side view of an automatic fresh air inlet.

Referring now to FIGS. 8–13, and more particularly to FIGS. 8 and 11, an automatic power flow fresh air inlet, generally designated 200, is shown. Fresh air inlet 200 generally includes main housing 210, fresh air openings 220, two valve plates 240, adjustable valve counterweights 260, cable 300, and valve lanyards 280. As shown in FIG. 9, the invention is modular, allowing for any preferred number of fresh air inlets 200 to be connected in series within a barrier such as a ceiling C. Room R, which is to be vented, has an adjustable static pressure for regulating air flow through air inlets 200. The adjustable static air pressure may be regulated through the use of wall fans. However, cable 300 and cable control mechanism 340 provide a means for overriding the regulating affects of the adjustable static pressure on the air inlets 200 as will be hereinafter described.

Referring to FIG. 8, the exterior portions of fresh air inlet 200 are shown in greater detail. Main housing 210 includes top wall 212, end walls 214, fresh air opening 220, upper central support member 226, cable apertures 232, and counterweight apertures 234. Fresh air openings 220 are positioned adjacent upper central support member 226 and are defined by fresh air opening side walls 222 and fresh air opening end walls 224. End walls 214 are preferably symmetric and contain cable apertures 232, counterweight apertures 234, and adjustable valve plate stops 270.

Main housing 210 may be preferably formed of any suitably durable material at the discretion of an individual. Main housing 210 may also be sized to any desired dimensions as preferred by an individual for use in providing air passage within a building. A plurality of main housings 210 may be aligned and interconnected in series as desired by an individual, to regulate fresh air inlet into a building.

The top wall 212 is preferably adapted for air tight sealing engagement with the ceiling C defining an air course for air flow into a building through one of the air inlets 200. The end walls 214 are preferably the structural support for the top wall 212, fresh air openings 220, and valve counter weights 260. The fresh air openings 220, in conjunction with the valve plates 240, preferably limit the air flow through the air inlets 200. The regulation of air flow through the air openings 220 may occur via the valve counter weights 260 as utilized during negative pressure conditions within the Room R or alternatively through the engagement of the means for manipulating 322 which draws the first end 310 of the cable 300 which, in turn, retracts the valve plates 240 into an open position 252. (FIGS. 9 and 10) It should be noted that the release for the means for manipulating 322 permits the cable 300 to be drawn by the cable counter weight 320 toward the rearward position 316, enabling the valve plates 240, with attached valve counter weights 260, to automatically fluctuate between an opened position 252 and closed position 250, dependent upon, and in response to, the negative pressure conditions within a room R. (FIGS. 10 and 11)

The upper central support member 226 preferably provides additional stability between adjacent fresh air opening sidewalls 222. FIG. 8. The fracture or breakage of a fresh air opening sidewall 222 is thereby minimized. The upper central support member 226 may be formed of any material as preferred by an individual and may be formed of closed cell foam material or a solid material at the discretion of an individual.

A means for engaging cable 236 is preferably provided within each of the end walls 214. The means for engaging cable 236 may be cable apertures 232, grooves, channels, and/or slots which may include rotational mechanisms adapted for engagement to the cable 300, such as pivot wheels or bearings at the discretion of an individual. The means for engaging cable 236 are preferably centrally positioned within each end wall 214 proximate to a lower edge and are preferably adapted to position a cable 300 in a desired location relative to the housing 210 of an air inlet 200.

In one embodiment, the cable apertures 232 are preferably centered, aligned, and traverse the end walls 214 proximate to a lower edge and are generally disposed below the counter weight apertures 234. The cable apertures 232 are preferably adapted to receive cable 300 to enable longitudinal extension and adjustable positioning thereof parallel to the main length dimension for the valve plates 240 and the upper central support member 226. The cable apertures 232 may preferably be sized to receive any dimension of cable 300 as desired by an individual.

The counter weight apertures 234 may preferably also be centered, aligned, and traverses the end walls 214 proximate to the top wall 212 and are generally disposed above the cable apertures 232. The counter weight apertures 234 are preferably adapted to receive an l-shaped lever arm 262. The counter weight apertures 234 may also be preferably sized to receive any diameter dimension of l-shaped lever arm 262 as preferred by an individual.

Each of the end walls 214 also preferably include an adjustable valve plate stop 270, rotatable connector 272, counter weight stop arms 274, having a positioning portion 276, and a plurality of regularly spaced stop level positioning recesses 278. The counter weight stop arms 274 are preferably adapted for rotatable engagement with respect to the adjustable valve plate stops 270 and rotatable connectors 272, enabling the positioning portions 276 to releasably and adjustably engage one of the plurality of stop lever positioning recesses 278 as desired by an individual based upon a level of negative pressure desired within a room R. The counter weight stop arms 274 are preferably adapted for engagement to the l-shaped lever arms 262 for limiting the rotation of the l-shaped lever arms 262 relative to the end walls 215 of the air inlets 200. It should be noted that the valve plates 240 are pivotally affixed to the main housing 210 via the valve plate hinges 242 and are also engaged to the l-shaped lever arms 262. Thereby, the rotation of the valve plates 240 from a closed position 250 to an open position 252 simultaneously upwardly pivots the l-shaped lever arms 262 toward the counter weight stop arm 274. The degree of rotation of the l-shaped lever arms 262 may thereby be regulated by the placement of the positioning portions 276 of the stop arms 274 within one of the plurality of regularly spaced stop lever positioning recesses 278. The degree of opening of the valve plates 240 may thereby be regulated to limit the flow of fresh air within the fresh air openings 220 during use of the fresh air inlets 200.

Figure 12:
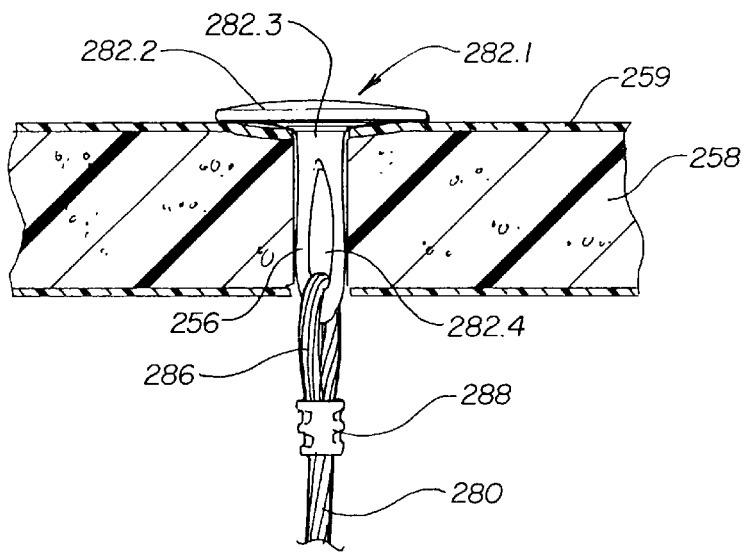
FIG. 12 is a detailed sectional view of a valve plate taken approximately at the line 12—12 of FIG. 10.

Referring to FIG. 10, valve plates 240 are preferably pivotally connected to the top wall 212 of main housing 210 via valve plate hinges 242. As shown in FIGS. 11 and 12, valve plates 240 are preferably rectangular in shape and generally comprise top side 244, bottom side 245, inner pressure foam core 258, and outer plastic shell 259, for making valve plate 240 rigid and spray washable. It is desirable to the valve plates 240 to be formed of a relatively lightweight material which thereby reduces the stress forces between the valve plate hinges 242 and the fresh air opening sidewalls 222 of the top wall 212. Also, a relatively lightweight material for the valve plates 240 reduces the size dimension required for the valve counterweights 260 enhancing ease of manufacture and reduction of material manufacturing expense. An outer plastic shell 259 is preferably provided to protect each valve plate 240 from damage which may occur upon unintentional contact with objects. Fracture and damage to the valve plates 240 may thereby be avoided. In addition, the outer plastic shell 259 for the valve plates 240 may also preferably function to protect the valve plates 240 during washing activities. An individual may desire to clean the valve plates 240 and the fresh air inlets 200 occasionally through utilization of power washing machinery. In these instances, the outer plastic shell 259 protects the valve plates 240 from damage when exposed to high pressure fluid contact.

The top sides 244 of the valve plates 240 preferably act as air deflecting surfaces for controlling the direction of air flow entering room R through air openings 220. In open position 252, the air passageways, generally designated 246, are formed between top sides 244 of valve plates 240 and valve seats 248, allowing fresh air A to enter room R. In closed position 250, top sides 244 of valve plates 240 rest against valve seats 248, thereby closing air passageways 246 and preventing fresh air A from entering room R.

It should be noted that the inner pressure foam cores 258 of the valve plates 240 may be formed of any material as desired by an individual, provided that the functions, attributes, and features described herein are not sacrificed. Alternatively, it should be noted that the valve plates 240 may be preferably formed in any shape or of any material as desired by an individual, provided that the essential attributes, features, and functions described herein are not sacrificed.

Referring to FIG. 8, l-shaped lever arms 262 extend through counter weight apertures 234 and connect valve plates 240 to adjustable valve counter weights 260. The horizontal portions 268 of the l-shaped lever arms 262 are preferably axial aligned with the axis of rotation of the respective valve plate hinges 242. Valve counter weights 260 preferably slidably engage l-shaped lever arms 262 and create closing moment $M_c$ about valve plate hinges 242 for pivoting valve plates 240 to closed position 250. Movement of valve counter weights 260 along l-shaped lever arms 262 may be restricted by rubber stops 264. Closing moment $M_c$ may be increased by sliding valve counter weights 260 away from valve plates 240 toward the positioning portions 276 of the stop arms 274 and may be decreased by sliding the counter weights 260 toward the valve plates 240.

Each valve plate 240 may be preferably fixedly connected to a plurality of valve plate hinges 242. Each valve plate hinge 242 may also be preferably fixedly engaged to the horizontal portion 268 of the l-shaped lever arms 262. Each horizontal portion 268 preferably is axially aligned with the axis of rotation for the respective valve plate 240. Each horizontal portion 268 also preferably extends longitudinally having a sufficient length dimension to traverse the entire main housing 210 extending through each of the opposite end walls 214. Each horizontal portion 268 is preferably free to rotate about the direction of longitudinal extension, thereby permitting the valve plates 240 to rotate downwardly from a closed position 250 where the valve plates 240 are engaged to the valve seats 248, to an open position 252 where the counter weights 260 are elevated, as depicted in FIG. 8, upwardly from the lower edge of a respective end wall 214.

Figure 13:
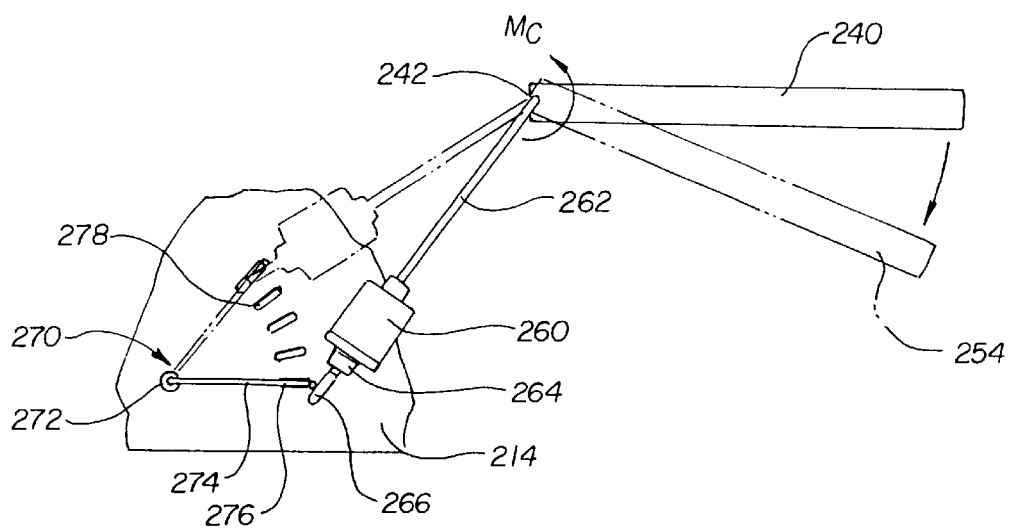
FIG. 13 is a side view of a valve opening adjuster limiting the motion of a valve counterweight and valve weight.

Referring to FIGS. 8 and 13, rotation of valve plates 240 is limited to fully opened position 254 as controlled by adjustable valve plate stops 270. Valve plate stops 270 comprise counter weight stop arms 274 rotatably connected to end walls 214 at 272 and preferably having positioning portions 276 which snap into cooperating recesses 278, as regularly spaced and positioned on end walls 214 to facilitate selection of a desired setting for a fully open position 254. As valve plates 240 open to fully opened position 254, preferably end portions 266 of l-shaped lever arms 260 engage counter weight stop arms 274 and prevent valve plates 240 from opening further. Stop lever positioning recesses 278 may alternatively be a plurality of regularly space apertures through the end walls 214 adapted for receiving engagement of stop pins which may be preferably adapted for engagement to the end portions 266 of the l-shaped lever arms 262. It should be noted that any other position limiting mechanism or stop mechanism may be utilized by an individual for restricting the upward rotation of the l-shaped lever arms 262 as preferred by an individual for limiting the downward rotation of the valve plates 240 and regulating the size of the opened position 254.

Referring now to FIG. 9, a negative static pressure P' relative to ambient pressure P in room R is achieved by forcing or drawing air out of room R through use of wall fans. Negative static pressure P' causes a net pressure force to act on the top sides 244 of valve plates 240, creating net pressure moment $M_p$ which counteracts closing moment $M_c$. (FIGS. 8 and 9) Opening moment $M_o$ is determined by the following equation: $M_o=M_p-M_c$. As long as opening moment $M_o$ is negative, valve plates 240 remain in closed position 250, adjacent and engaged to valve seats 248 which inhibit air flow through air inlets 200. (FIG. 10) However, as opening moment $M_o$ becomes positive, valve plates 240 pivot downwardly to open to a static position, thereby forming air passageways 246, enabling fresh air A to flow into room R, as shown in FIG. 10.

Referring now to FIGS. 10 and 11, cable 300 may preferably extend through and slidably engage cable apertures 232 and move between forward position 314 and rearward position 316. Valve lanyards 280 preferably extend through lanyard hoops 230, as connected to lower central support member 228, and are attached to cable 300 by way of cable connectors 284. Cable connectors 284 preferably act to limit the motion of cable 300 between one of the cable apertures 232 and lanyard hoops 230 thereby defining a forward position 314 and rearward position 316.

Valve lanyards 280 attach to valve plates 240 by way of valve plate connectors 282. FIG. 12 shows one embodiment of valve plate connectors 282 having a valve pin 282.1. Each valve pin 282.1 is inserted into a valve plate bore 256 and comprises head 282.2, stem 282.3, and eye 282.4. Valve end 286 of valve lanyards 280 loop through eye 283 and reconnects to valve lanyards 280 by way of pinching ring 288. Lanyard loops 230 may be formed of eye bolts and nuts and/or any other affixation mechanism at the preference of an individual provided that slidable and passing engagement is provided to the valve lanyards 280. It should be noted that the cable 300 is preferably positioned above the lower central support member 228 and lanyard loops 230. It should also be noted that the valve lanyards 280 may be permanently or releasably attached to the valve plates 240 by any means as preferred by an individual, provided that the essential functions, features, and attributes described herein are not sacrificed.

When cable 300 is in rearward position 316, valve lanyards 280 are preferably slack, causing valve plates 240 either to be closed and engaged to valve seats 248 or partially opened to a static position, dependent upon ambient environmental conditions. (FIGS. 10 and 11) However, closed position 250 or static position may be overridden by retractable adjustable of cable 300. Moving cable 300 toward forward position 314 causes tension to form on valve lanyards 280 whereby the drawing of the cable 300 applies a first cable moment $M_{fc}$ to valve plates 240. First cable moment $M_{fc}$ increases opening moment $M_o$ and causes valve plates 240 to pivot downwardly toward fully opened position 252 relative to static position for enhancement of the flow of fresh air A into room R.

Referring now to FIG. 9, cable 300 preferably extends through air inlets 200 and over cable pulleys 304. Cable counter weight 320 is preferably connected to second end 312 of cable 300, preventing first cable moment $M_{fc}$ from affecting the position of cable 300, further maintaining tension in cable 300 for greater ease of retraction. Cable control mechanism 340 may be preferably connected to first end 310 of cable 300 for retraction of cable 300 between forward position 314 and rearward position 316. Several embodiments of cable control mechanism 340 are available to an individual. One embodiment of cable control mechanism 340 comprises a crank and a crank shaft whereby first end 310 of cable 300 is wound and unwound about the crank shaft, either by hand or motor, to facilitate moving cable 300 between forward position 314 and rearward position 316. Another embodiment of cable control mechanism 340 comprises a first connector, such as a hoop, attached to first end 310 of cable 300 and a plurality of cooperating second connectors, such as pins, vertically aligned along a wall mountable base. The first connector attaches to one of the second connectors to secure the cable 300 between forward position 314 and rearward position 316. Another embodiment of cable control mechanism 340 comprises a second cable counter weight for balancing cable counter weight 320, thereby allowing cable 300 to be positioned between forward position 314 and rearward position 316 without slippage. It should be noted that the cable control mechanisms 340, cable 300, pulleys 304, cable counter weight 320, in conjunction, are referred to the means for manipulating for the automatic power fresh air inlets 200.

Means for manipulating or cable control mechanism 340 may also preferably be operated through electrical switches for drawing and reverse of a winding drum as engaged to the cable 300. In addition, cable control mechanism 340 may also include a manual override mechanism permitting an individual to wind or draw the cable 300 toward the forward position 314 or release for return to the static or rearward position 316 as preferred by an individual. The provision of a powered or manually operated means for manipulating or cable control mechanism 340 enables an individual to uniformly regulate and open a plurality of aligned and interconnected series of fresh air inlets 200 to enhance air flow A within a room R. Alternatively, the engagement or release of the cable control mechanism 340 preferably permits the cable 300 to move toward a rearward position 316 to allow valve plates 240 to return to a partially opened static position or a closed position 250, dependent upon the ambient environmental conditions within a room R, thereby reducing the volume of air flow A through a room R.

Cable 300 may preferably be formed of steel, metal, and/or nylon or cotton-type rope material, at the discretion of an individual. It should be noted that any sturdy, yet flexible material may be selected for the cable 300 at the discretion of an individual, provided that the essential functions, features, and attributes described herein are not sacrificed.

Cable pulleys 304 are preferably engaged to opposite vertical walls of a room R and are adapted to support cable 300 as affixed in series to a plurality of air inlets 200 for regulating the air flow A within a zone Z of a room R or building. It should be noted that a plurality of sets of cable pulleys 304 may be regularly spaced along the entire length of a building or room R at the discretion of an individual, for regulating the air flow A within a building. A plurality of regularly spaced sets of cable control systems may thereby be utilized within a building. It should be noted that the cable pulleys 304 may be replaced with eye bolts or hooks or block and tackle mechanisms at the discretion of an individual. It should also be noted that the cable pulleys 304 may also or alternatively be engaged to a ceiling C of a building at the discretion of an individual.

The release of the cable control mechanism 34C preferably permits the cable 300 to be drawn toward the rearward position 316 due to the forces of gravity upon the cable counter weight 320. The movement of the cable 300 toward the rearward position 316 releases tension on the valve lanyards 280, permitting the free upward rotation of the valve plates 240. The cable 300 continues to move toward the rearward position 316 until such time as the cable connectors/stops 284 engage the lanyard hoops 230 which terminate further movement of the cable 300 toward the rearward position 316. Alternatively, a cable stop 284 engaged to the cable 300 and positioned exterior to the end wall 214 toward the forward position 314 may be utilized. The release of the cable control mechanism 340 would then permit the cable 300 to move rearwardly toward the rearward position 316, via gravity affects on the cable counter weight 320, until such time as a cable stop 284 engages the exterior surface of an end wall 214, which would terminate further cable movement.

It should be noted that movement of the cable 300 in either direction, toward the forward position 314, or rearward position 316, may be incrementally regulated by the cable control mechanism 340 which would include a position locking mechanism or an unwinding lock at the preference of an individual. This cable control mechanism 340 would then enable an individual to incrementally adjust, open, or close one or a series of valve plates 240 at the individuals discretion for regulation of air flow A within a room R.

Continuing to refer to FIG. 9, two fresh air inlets 200 are connected in series within ceiling C between room R and fresh air source A, each sharing cable 300. Several fresh air inlets 200 may be joined in series in this manner at the discretion of an individual. Each fresh air inlet 200 may have different settings for valve counter weights 260 and valve stops 270 to provide the desired volume of air flow A. Environmental control computer 360 may be connected to cable control mechanism 340, in certain embodiments, for controlling environmental conditions such as static pressure, and/or air speed. Environmental control computer 360 may then sense an environmental condition in a zone of a room R and control air flow A by sending a signal to cable control mechanism 340. Cable control mechanism 340 may respond to the signal by adjusting cable 300 to optimize the environmental conditions in room R. Environmental control computer 360 may include data storage devices 362 for recording environmental conditions and air inlet settings. It should also be noted that a centralized environmental control computer 360 may be provided for simultaneously regulating a plurality of interconnected cable control mechanisms 340 at the discretion of an individual.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. An automatic fresh air inlet comprising:
    (a) a housing comprising two end walls, each end wall having a means for engaging, and a top wall having at least one fresh air opening;
    (b) at least one valve plate pivotally connected to the housing and adjacent the fresh air opening, an air passage way defined between the valve plate and the housing;
    (c) a cable slidably connected to said means for engaging, said cable having a first end and a second end;
    (d) a cable counter weight connected to said second end of said cable;
    (e) a valve lanyard adjustably connected to said valve plate and to said cable; and
    (f) a cable control mechanism connected to said first end of said cable.

2. The automatic fresh air inlet according to claim 1, said means for engaging comprising cable apertures traversing said two end walls.

3. The automatic fresh air inlet according to claim 1, said means for engaging comprising cable slots traversing said two end walls.

4. The automatic fresh air inlet according to claim 1, wherein said valve plate is adjustable between a closed position and a fully opened position.

5. The automatic fresh air inlet according to claim 1, said housing further comprising a lower central support extending between said end walls, said lower central support having a lanyard loop, said valve lanyard extending through said lanyard loop.

6. The automatic fresh air inlet according to claim 5, said valve plate further comprising a bore, said valve lanyard adjustably engaged to said bore.

7. The automatic fresh air inlet according to claim 6, further comprising a second valve plate, said second valve plate having a second valve lanyard adjustably connected to said cable.

8. The automatic fresh air inlet according to claim 7, said second valve plate further comprising a second bore, said second valve lanyard adjustably engaged to said second bore, said second valve lanyard slidably engaged to said lanyard loop.

9. The automatic fresh air inlet according to claim 8, further comprising at least one pulley engaged to a building, said cable engaging said pulley.

10. The automatic fresh air inlet according to claim 1, further comprising a plurality of automatic fresh air inlets connected in series to said cable.

11. The automatic fresh air inlet according to claim 9, said cable control mechanism comprising a motor.

12. The automatic fresh air inlet according to claim 9, said cable control mechanism comprising a means for locking.

13. The automatic fresh air inlet according to claim 12, said cable control mechanism further comprising a manual override mechanism.

14. The automatic fresh air inlet according to claim 9, further comprising an environmental control computer connected to said cable control mechanism.

15. An automatic fresh air inlet comprising:
(a) a housing comprising two end walls, each end wall having a cable retainer, and a top wall having at least one fresh air opening;
(b) at least one valve plate pivotally connected to the housing and adjacent the fresh air opening, an air passage way defined between the valve plate and the housing;
(c) a cable slidably connected to said cable retainer, said cable having a first end and a second end;
(d) a cable counter weight connected to said second end of said cable; and
(e) a valve counter weight connected to said valve plate, said valve counter weight permitting said valve plate to open or close in response to ambient air pressure conditions when said cable counter weight is in a first position.

16. The automatic fresh air inlet according to claim 15, said valve plate further comprising a longitudinal axis and a hinge engagement edge, said cable being substantially parallel to said longitudinal axis positioned below said hinge engagement edge.

17. A modular fresh air inlet comprising:
(a) a rectangular housing having two end walls, a top wall, a fresh air entrance in the top wall, a drive rod aperture formed in each end wall, a drive rod extending through the housing and slidably mounted in each drive rod aperture;
(b) a valve plate pivotally connected to the housing adjacent to the fresh air entrance, an air passageway defined between the valve plate and the housing, the valve plate attached to the drive rod;
(c) a linear actuator connected to the drive rod for moving the drive rod to urge the valve plate to progressively pivot between an open and a closed position;
(d) an upper support bar above the valve plate, and a lower support bar below the valve plate, the drive rod connected to the valve plate by a rope supported by the upper support bar; and
(e) a lift pulley pivotally mounted on the upper support bar over the valve plate, an alignment pulley pivotally mounted on the lower support bar, the rope engaging the alignment pulley and the lift pulley, gravity urging the valve plate to pivot to the open position and the rope bearing against the valve plate to urge the valve plate to the closed position.

18. The invention of claim 17, further comprising an environmental control connected to the linear actuator.

19. The invention of claim 17, wherein the connector between the linear actuator and the drive rod is rigid.

20. The invention of claim 17, further comprising an insulation shroud extending from the housing into the fresh air entrance.

21. A modular fresh air assembly for controlling the direction, volume, and velocity of air flowing from an attic through a ceiling into a livestock confinement room comprising:
(a) a plurality of fresh air inlets, each fresh air inlet comprising a rectangular housing on the ceiling having two end walls and a top wall, a divider on the top wall extending between the end walls, a first fresh air opening in the top wall on the housing adjacent the divider in fluid communication with the attic and the room, a drive rod slidably mounted through both end walls and extending outside the housing;
(b) each air inlet further comprising a first valve plate having an air deflecting face pivotally attached to the housing by the first fresh air opening, the first valve plate also connected to the drive rod, a first air passageway between the first valve plate and the housing, the first air passageway having a size; and
(c) a rigid connection connecting the drive rods of adjacent air inlets, a control mechanism connected to one drive rod whereby in each fresh air inlet the first valve plate is pivoted to change the size of the first air passageway from an open position to a closed position.

22. The invention of claim 21, further comprising a first rope in each fresh air inlet extending between the first valve plate and a rod connector on the drive rod.

23. The invention of claim 22, further comprising an upper support bar, the first rope supported by the upper support bar.

24. The invention of claim 23, further comprising a center hole in the divider, the upper support bar being on the housing above the divider, a first lift pulley pivotally mounted on the upper support bar adjacent the first air passageway whereby the first rope extends from the rod connector through the center hole around the first lift pulley to bear against the first valve plate.

25. The invention of claim 24, further comprising a lower support bar on the housing below the divider, a first center pulley pivotally mounted on the upper support bar near the center hole, and a first alignment pulley pivotally mounted on the lower support bar whereby the first rope is further supported by the first alignment pulley and the first center pulley.

26. The invention of claim 21, further comprising a second fresh air opening in the top wall of each fresh air inlet, the second fresh air opening spaced from the first fresh air opening, a second valve plate pivotally mounted on the housing adjacent the second fresh air opening, the second valve plate connected to the drive rod, the second valve plate pivoting from a closed position blocking the second air opening to an open position whereby the first and second valve plates move in relation to each other.

27. The invention of claim 26, wherein the first valve plate is connected to the drive rod by a first rope, the second valve plate is connected to the drive rod by a second rope, a rod connector on the drive rod attaching the first and second ropes to the drive rod.

28. The invention of claim 27, further comprising an upper support bar on the housing above the first and second fresh air openings supporting the first and second ropes, a center hole in the divider and the upper support bar, the first and second ropes extending through the center hole and supported by the upper support bar.

29. The invention of claim 28, further comprising a first lift pulley on the upper support bar over the first fresh air opening, a second lift pulley on the upper support bar over the second fresh air opening.

30. The invention of claim 29, wherein the upper support bar has U-shape having two vertical plate portions connected together by a horizontal plate portion, the first and second lift pulley mounted between the two vertical plate portions, the center hole extending through the horizontal plate portion, a first and second center pulley pivotally mounted or the upper support bar between the two vertical plate portions proximate to the center hole, a lower support bar on the housing below the valve plates, a first and second alignment pulley pivotally mounted on the lower support bar.

31. A modular fresh air assembly in combination with a fresh air source and a zone of a room to be ventilated, the modular fresh air assembly comprising:

(a) a plurality of fresh air inlets, each fresh air inlet comprising a housing having an air hole extending between the fresh air source and the room, a fresh air entrance on the air hole adjacent the fresh air source, a valve plate pivotally mounted on the housing in the air hole by a hinge, an air passageway between the housing and the valve plate, a drive rod on each fresh air inlet, the drive rod attached to the valve plate and extending through housing, the drive rod bearing against the valve plate to urge the valve plate to progressively pivot about the hinge from an open position to a closed position, the valve plate closing the air passageway in the closed position, the plurality of fresh air inlets arranged in a group of rigidly connected fresh air inlets having the drive rods longitudinally connected; and (b) a control mechanism connected to the drive rod of one fresh air inlet in the group of rigidly connected fresh air inlets to progressively open and close the air passageways in each fresh air inlet by bearing against the longitudinally connected drive rods whereby the velocity, volume, and direction of air entering the zone from the fresh air source is controlled by the control mechanism moving the drive rod axially to urge all the valve plates in the respective group of fresh air inlets to pivot about the hinge.

32. The invention of claim 31, further comprising an environmental control in the zone and in communication with the control mechanism.

33. The invention of claim 32, further comprising a network connected to the control mechanism, an environment computer connected to the network whereby the modular fresh air assembly is controlled by the environment computer.

34. The invention of claim 33, further comprising circuitry in the environment computer configured for receiving environmental signals from the environmental control and sending control signals to the control mechanism.

* * * * *